United States Patent
Ogawa et al.

(10) Patent No.: US 8,450,035 B2
(45) Date of Patent: May 28, 2013

(54) ELECTROPHOTOGRAPHIC PHOTOSENSITIVE BODY

(75) Inventors: Noriyoshi Ogawa, Kamisu (JP); Toru Oikawa, Kamisu (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 787 days.

(21) Appl. No.: 12/310,027

(22) PCT Filed: Aug. 7, 2007

(86) PCT No.: PCT/JP2007/065457
§ 371 (c)(1),
(2), (4) Date: Oct. 28, 2009

(87) PCT Pub. No.: WO2008/018467
PCT Pub. Date: Feb. 14, 2008

(65) Prior Publication Data
US 2010/0092212 A1   Apr. 15, 2010

(30) Foreign Application Priority Data

Aug. 8, 2006  (JP) ................................. 2006-215600

(51) Int. Cl.
*G03G 5/05* (2006.01)
(52) U.S. Cl.
USPC ............................ 430/59.6; 430/96; 399/159
(58) Field of Classification Search
CPC .................................................. G03G 5/0564
USPC ................... 430/59.6, 96; 399/159
See application file for complete search history.

(56) References Cited

U.S. PATENT DOCUMENTS 5,449,572 A * 9/1995 Ashiya et al. ................... 430/96

FOREIGN PATENT DOCUMENTS

| JP | 02-254462 | 10/1990 |
| JP | 05-158250 | 6/1993 |
| JP | 06011877 A * | 1/1994 |
| JP | 06-214409 | 8/1994 |
| JP | 08-272125 | 10/1996 |
| JP | 09-006022 | 1/1997 |
| JP | 11-218944 | 8/1999 |

OTHER PUBLICATIONS

English language machine translation of JP 05-158250 (Jun. 1993).*
English language machine translation of JP 06-11877 (Jan. 1994).*
English language machine translation of JP 08-272125 (Oct. 1996).*
International Search Report dated Nov. 6, 2007 in the International (PCT) Application PCT/JP2007/065457 of which the present application is the U.S. National Stage.

* cited by examiner

*Primary Examiner* — Christopher Rodee
(74) *Attorney, Agent, or Firm* — Wenderoth, Lind & Ponack, L.L.P.

(57) ABSTRACT

Disclosed is an electrophotographic photosensitive body which is remarkably improved in pencil scratch resistance and wear resistance. Specifically disclosed is an electrophotographic photosensitive body wherein a polycarbonate resin having a structural unit (1) represented by the formula below is used as a binder resin for a photosensitive layer (or for a charge-transporting layer in case of multilayer type) which is formed on a conductive base. [chemical formula 1] (1) (In the formula, $R_1$-$R_{30}$ respectively represent a hydrogen atom or a substituent selected from the group consisting of fluorine, chlorine, bromine, iodine, an alkyl group having 1-17 carbon atoms, an aryl group having 6-12 carbon atoms, an alkoxy group having 1-5 carbon atoms, an alkenyl group having 2-12 carbon atoms and an aralkyl group having 7-17 carbon atoms.)

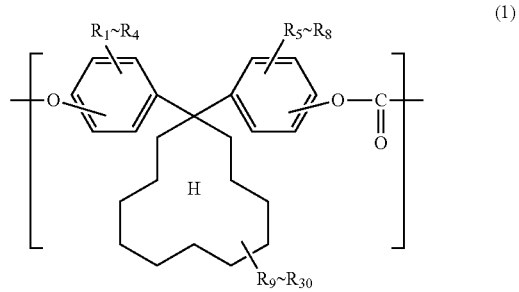

13 Claims, No Drawings

ELECTROPHOTOGRAPHIC PHOTOSENSITIVE BODY

TECHNICAL FIELD

The present invention relates to an electrophotographic photosensitive body. More precisely, the present invention relates to an electrophotographic photosensitive body produced using a specific polycarbonate resin as a binder resin for a photosensitive layer.

BACKGROUND ART

Currently, the electrophotographic technology is widely applied for copying machines, laser beam printers (hereinafter, "LBP"), fax machines or the like because of its high-speed processability, high image quality and so on.

As electrophotographic photosensitive bodies in the field of this electrophotographic technology, inorganic photoconductive substances such as selenium, selenium/tellurium alloys, selenium/arsenic alloys, cadmium sulfide or the like have mainly been used conventionally. However, recently an electrophotographic photosensitive body using an organic photoconductive substance is been developed from the viewpoint of toxicity, safety, cost, productivity and the like. In case when the organic photoconductive substance is a low-molecular weight substance, it is a general practice to mix it with a binder resin to form a coating film. As the binder resin, various thermoplastic resins and thermosetting resins such as polymethylmethacrylate, polystyrene, vinyl polymers such as polyvinyl chloride and copolymers thereof, polycarbonate, polyester, polysulfon, phenoxy resins, epoxy resins and silicone resins have been used. Electrophotographic photosensitive bodies using these various binder resins can be formed into a thin film with ease by means of a cast film-forming method and hence are suitable for mass production and the prices thereof are relatively low. Of those resins, a polycarbonate resin shows relatively excellent characteristics, especially the polycarbonate resin derived from 1,1-bis(4-hydroxyphenyl)cyclohexane is excellent in wear resistance and electrophotographic properties, and hence is used as a binder resin (see Patent Document 1).

However, as a result of popularization of copying machines and LBPs in large quantity with low price, the frequency that ordinary users exchange the electrophotographic photosensitive body by themselves is increased, in connection with which the case damaging the surface of the electrophotographic photosensitive body accidentally also came to be reported. Especially, the surface may be scratched when a sheet of paper or a film protecting the main body of the electrophotographic photosensitive body is removed by using a pencil or an automatic pencil near at hand, and hence an improvement is required.

Meanwhile, an electrophotographic photosensitive body which is improved in wear resistance by forming a hardcoat on its surface. However, though the electrophotographic photosensitive body has excellent wear resistance, its production process is complicated and the cost is high. Therefore, an electrophotographic photosensitive body which can be improved in wear resistance with ease by a conventional production process is requested. (See Patent Document 2)

Polycarbonate containing a structural unit having a cyclododecane structure is known as a polycarbonate resin excellent in heat resistance (Patent Document 3). However, it is not known that the polycarbonate is excellent in wear resistance and is suitable for a binder resin for a photosensitive layer of an electrophotographic photosensitive body.

Patent Document 1: Jpn. Pat. Laid-Open Publication No. S63-40159

Patent Document 3: Jpn. Pat. Laid-Open Publication No. H2-216161

Patent Document 4: International Publication No. WO86/00320

DISCLOSURE OF THE INVENTION

Problems to be Solved by the Invention

The problem to be solved by the present invention is to provide an electrophotographic photosensitive body which is remarkably improved in pencil scratch resistance and wear resistance.

Means for Solving the Problems

Thus, the present invention relates to an electrophotographic photosensitive body shown below.

(1) An electrophotographic photosensitive body having a conductive support and a photosensitive layer formed on said conductive support, wherein a polycarbonate resin having a structural unit (1) represented by the following formula is used as a binder resin for the photosensitive layer.

[Chemical Formula 1]

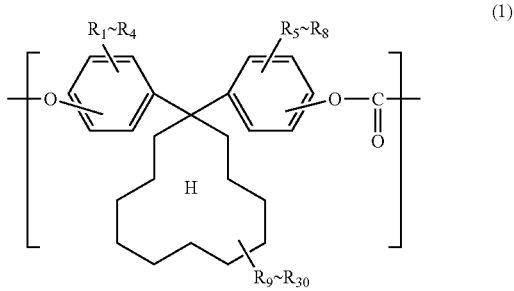

(In the formula, $R_1$-$R_{30}$ respectively represent a hydrogen atom or a substituent selected from the group consisting of fluorine, chlorine, bromine, iodine, an alkyl group having 1-17 carbon atoms, an aryl group having 6-12 carbon atoms, an alkoxy group having 1-5 carbon atoms, an alkenyl group having 2-12 carbon atoms and an aralkyl group having 7-17 carbon atoms.

(2) The electrophotographic photosensitive body according to claim 1, wherein said structural unit (1) is derived from 1,1-bis(4-hydroxyphenyl)cyclododecane or 1,1-bis(4-hydroxy-3-methylphenyl)cyclododecane.

(3) The electrophotographic photosensitive body according to claim 1 or 2, wherein said polycarbonate resin comprises said structural unit (1) and at least one structural unit derived from a bisphenol selected from the group consisting of 1,1'-biphenyl-4,4'-diol, 1,1-bis(4-hydroxyphenyl)ethane, bis(4-hydroxyphenyl)ether, 2,2-bis(4-hydroxyphenyl)propane, 2,2-bis(4-hydroxy-3-methylphenyl)propane, 1,1-bis(4-hydroxyphenyl)cyclohexane and 1,1-bis(4-hydroxyphenyl)-1-phenylethane.

(4) The electrophotographic photosensitive body according to any one of claims 1 to 3, wherein the content of said structural unit (1) is 5 to 100% by weight based upon the total units constituting the polycarbonate resin.

(5) The electrophotographic photosensitive body according to any one of claims 1 to 4, wherein the intrinsic viscosity of said polycarbonate resin is 0.3 to 2 dl/g.

(6) The electrophotographic photosensitive body according to any one of claims 1 to 5, wherein said photosensitive layer is of multilayer type consisting of a charge generating layer and a charge transport layer.

(7) The electrophotographic photosensitive body according to claim 6, wherein said polycarbonate resin having a structural unit (1) is used as a binder resin for said charge transport layer.

(8) An image forming apparatus characterized in that the electrophotographic photosensitive body according to any one of claims 1 to 7 is mounted therein.

Effects of the Invention

According to the present invention, an electrophotographic photosensitive body which is remarkably excellent in pencil scratch resistance and wear resistance compared with the conventional ones can be obtained by using a polycarbonate resin having a cyclododecane structure as a binder resin for a photosensitive layer is used as a binder resin for the photosensitive layer, and hence extension of a service life and improvement of maintenance workability of a photosensitive body for a copying machine, a printer or the like is expected.

BEST MODE FOR CARRYING OUT THE INVENTION

The electrophotographic photosensitive body of the present invention has a photosensitive layer on a conductive support.

(1) Conductive Support

As the conductive support for the electrophotographic photosensitive body of the present invention, a metallic material such as aluminum, stainless steel or nickel, or an insulating body such as a polyester film, a phenol resin film and paper having an electrically conductive layer of aluminum, palladium, tin oxide, indium oxide or the like on its surface can be used.

(2) Photosensitive Layer (i) Structure of Photosensitive Layer

The photosensitive layer of an electrophotographic photosensitive body is formed of material wherein a charge generating material which generates charge by exposure to light and a charge transport material which transports charge are dispersed in a binder resin. The structure of the photosensitive layer is not particular limited. It can be of single-layer type wherein the charge generating material and the charge transport material are dispersed together in a binder resin, or it can also be of multilayer type which is formed of a combination of multiple layers such as those functionally separated into a charge generating layer containing a charge generating material and a charge transport layer containing a charge transport material.

Examples of the multilayer type photosensitive layer include a photosensitive layer comprising two layers which are a charge generating layer for generating a charge by exposure to light and a charge transport layer for transporting a charge. Recently, a multilayer type electrophotographic photosensitive body is in the main stream. The charge generating layer is formed using a binder resin wherein a charge generating material is dispersed. The charge transport layer is formed on the charge generating layer by means of a known method using a binder resin wherein a charge transport material is dispersed.

The electrophotographic photosensitive body of the present invention can be either of single-layer type or of multilayer type, preferably of multilayer typ.

The electrophotographic photosensitive body of the present invention can have, if necessary, an underlying layer, a protection layer and/or an adhesive layer other than the above-mentioned conductive support and photosensitive layer.

(ii) Charge Generating Material

As a charge generating material, organic pigments of azoxybenzenes, disazo compounds, trisazo compounds, benzimidazoles, polycyclic quinolines, indigoids, quinacridones, phthalocyanines, perylenes, methines and the like can be used.

These charge generating materials are used in the form of a fine particle dispersed in a binder resin.

(iii) Charge Transport Material

Examples of charge transport materials include polytetracyanoethylene; fluorenone compounds such as 2,4,7-trinitro-9-fluorenone; nitro compounds such as dinitroanthracene; succinic anhydride; maleic anhydride; dibromo maleic anhydride; triphenylmethane compounds; oxadiazole compounds such as 2,5-di(4-dimethylaminophenyl)-1,3,4-oxadiazole; styryl compounds such as 9-(4-diethylaminostyryl)anthracene; stilbene compounds such as 4-(2,2-bisphenyl-ethene-1-il)triphenylamine and 4-(2,2-bisphenyl-ethen-1-yl)-4',4''-dimethyltriphenylamine; carbazole compounds such as triphenylamine-poly(N-vinylcarbazole); pyrazoline compounds such as 1-phenyl-3-(p-dimethylaminophenyl) pyrazoline; amine derivatives such as 4,4',4''-tris(N,N-diphenylamino)triphenylamine and N,N'-bis(3-methylphenyl)-N,N'-bis(phenyl)benzidine; conjugated unsaturated compounds such as 1,1-bis(4-diethylaminophenyl)-4,4-diphenyl-1,3-butadiene, hydrazone compounds such as 4-(N,N-diethylamino)benzaldehyde-N,N-diphenylhydrazaone; nitrogen-containing cyclic compounds such as indole compounds, oxazole compounds, isooxazole compounds, thiazole compounds, thiadiazole compounds, imidazole compounds, pyrazole compounds, pyrazoline compounds and triazole compounds, and condensed polycyclic compounds. The above-listed charge transport materials can be used each independently, or two or more of them can be used in combination with each other. These charge transport materials are used by dispersing in a binder resin.

(3) Polycarbonate Resin (i) Structural Unit (1)

The electrophotographic photosensitive body of the present invention is characterized in that a polycarbonate resin having at least a structural unit represented by the following formula (1) (herein after "structural unit (1)") is used as a binder resin for the photosensitive layer. That is, in case when the photosensitive layer is of single-layer type, said polycarbonate resin is used as a binder resin for a single photoconductive layer. In case when the photosensitive layer is of multilayer type, said polycarbonate resin is used as a binder for at least a charge transport layer.

[Chemical Formula 2]

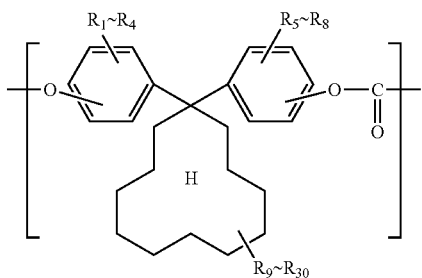

(1)

In the above formula (1), $R_1$-$R_{30}$ respectively represent a hydrogen atom or a substituent selected from the group consisting of fluorine, chlorine, bromine, iodine, an alkyl group having 1-17 carbon atoms, an aryl group having 6-12 carbon atoms, an alkoxy group having 1-5 carbon atoms, an alkenyl group having 2-12 carbon atoms and an aralkyl group having 7-17 carbon atoms.

The alkyl group having 1-17 carbon atoms is preferably an alkyl group having 1-5 carbon atoms, examples of which include a methyl group, an ethyl group and a t-butyl group.

Examples of the aryl group having 6-12 carbon atoms include a phenyl group and a naphthyl group.

The alkoxy group having 1-5 carbon atoms is preferably an alkoxy group having 1-2 carbon atoms, examples of which include a methoxy group and an ethoxy group.

The alkenyl group having 2-12 carbon atoms is preferably an alkenyl group having 2-5 carbon atoms, examples of which include a propylene group, an allyl group and a vinyl group.

The aralkyl group having 7-17 carbon atoms is preferably an aralkyl group having 7-10 carbon atoms, examples of which include a benzyl group and a phenethyl group.

Furthermore, in case when any one of the above-mentioned substituents $R_1$-$R_{30}$ has a carbon atom, the carbon atom can be bonded with a substituent selected from the group consisting of an alkyl group having 1-5 carbon atoms, an alkoxy group having 1-5 carbon atoms, fluorine, chlorine, bromine and iodine.

It is more preferable that, in the above formula (1), $R_1$-$R_4$ and $R_5$-$R_8$ respectively represent independently a hydrogen atom or a substituent selected from the group consisting of an alkyl group having 1-5 carbon atoms, an aryl group having 6-12 carbon atoms, an alkoxy group having 1-2 carbon atoms, an alkenyl group having 2-5 carbon atoms and an aralkyl group having 7-10 carbon atoms, and $R_9$-$R_{30}$ respectively represent a hydrogen atom or a substituent selected from the group consisting of an alkyl group having 1-5 carbon atoms. In case when any one of said substituents $R_1$-$R_{30}$ has a carbon atom, the carbon atom can be bonded with a halogen such as fluorine, chlorine, bromine or iodine.

Among them, it is particularly preferable that at least one of $R_1$-$R_4$ represents a hydrogen atom, at least one of $R_5$-$R_8$ represents a hydrogen atom and at least one of $R_9$-$R_{30}$ represents a hydrogen atom.

Examples thereof include a structural unit derived from 1,1-bis(4-hydroxyphenyl)cyclododecane, 1,1-bis(4-hydroxy-3-methylphenyl)cyclododecane, 1,1-bis(4-hydroxy-3-phenylphenyl)cyclododecane, 1,1-bis(4-hydroxy-3-t-butylphenyl)cyclododecane, 1,1-bis(4-hydroxy-3-sec-butylphenyl)cyclododecane, 1,1-bis(4-hydroxy-3-allylphenyl)cyclododecane, 1,1-bis(4-hydroxy-3,5-dimethylphenyl)cyclododecane, 1,1-bis(4-hydroxy-3-fluorolphenyl)cyclododecane, 1,1-bis(4-hydroxy-3-chlorophenyl)cyclododecane, 1,1-bis(4-hydroxy-3-bromophenyl)cyclododecane, 7-ethyl-1,1-bis(4-hydroxyphenyl)cyclododecane, 5,6-dimethyl-1,1-bis(4-hydroxyphenyl)cyclododecane, 1,1-bis(2-hydroxyphenyl)cyclododecane or the like.

The polycarbonate resin to be used for the present invention can comprise at least two of the structural units belonging to the category of the above-mentioned structural unit (1). Among them, a structural unit derived from 1,1-bis(4-hydroxyphenyl)cyclododecane or 1,1-bis(4-hydroxy-3-methylphenyl)cyclododecane is particularly preferable.

(ii) Other Structural Units

The polycarbonate resin to be used for the present invention can, if necessary, comprise other carbonate-forming units (other structural units) than the above-mentioned structural unit (1).

In case when the polycarbonate resin is a polycarbonate copolymer comprising other structural units, examples of said other structural units include a carbonate-forming unit derived from a bisphenol selected from the group consisting of 1,1'-biphenyl-4,4'-diol, bis(4-hydroxyphenyl)methane, bis(4-hydroxyphenyl)ether, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 2,2-bis(4-hydroxy-3-t-butylphenyl)propane, 1,1-bis(4-hydroxyphenyl)cyclopentane, 1,1-bis(4-hydroxyphenyl)cyclohexane(bisphenol Z; BPZ), 1,1-bis(4-hydroxyphenyl)-3,3,5-trimethylcyclohexane, 2,2-bis(4-hydroxy-3-allylphenyl)propane, 2,2-bis(4-hydroxyphenyl)hexafluoropropane, 1,1-bis(4-hydroxyphenyl)-1-phenylethane, bis(4-hydroxyphenyl)diphenylmethane, 9,9-bis(4-hydroxyphenyl)fluorene, 9,9-bis(4-hydroxy-3-methylphenyl)fluorene, 4,4'-[1,4-phenylene-bis(1-methylethylidene)]bisphenol, 4,4'-[1,3-phenylene-bis(1-methylethylidene)]bisphenol, 4,4'-butylidene-bis(3-methyl-6-t-butylphenol), α,ω-bis[3-(o-hydroxyphenyl)propyl]polydimethyldiphenyl random copolymerized siloxane and α,ω-bis[3-(o-hydroxyphenyl)propyl]polydimethylsiloxane.

The polycarbonate resin of the present invention can comprise two or more of these other structural units.

Among them, in addition, it is preferable to use a carbonate-forming unit derived from a bisphenol selected from the group consisting of 1,1'-biphenyl-4,4'-diol, 1,1-bis(4-hydroxyphenyl)ethane, bis(4-hydroxyphenyl)ether, 2,2-bis(4-hydroxyphenyl)propane, 2,2-bis(4-hydroxy-3-methylphenyl)propane, 1,1-bis(4-hydroxyphenyl)cyclohexane and 1,1-bis(4-hydroxyphenyl)-1-phenylethane.

Particularly, it is preferable to use a carbonate-forming unit derived from a bisphenol selected from the group consisting of 2,2-bis(4-hydroxyphenyl)propane and 1,1-bis(4-hydroxyphenyl)cyclohexane.

(iii) Proportion of Structural Units

The content of the structural unit (1) of the above-mentioned polycarbonate resin is preferably 5 to 100% by weight, more preferably 10 to 100% by weight, further preferably 50 to 100% by weight, most preferably 70 to 100% by weight based upon the total structural units constituting the polycarbonate. In case when the content of the structural unit (1) is too low, it may bring about the defect such as deterioration of wear resistance.

In case when the above-mentioned polycarbonate resin is a copolymer of the structural unit (1) and other carbonate-forming units (other structural units), it can be a random copolymer wherein respective structural units are bonding randomly with each other, or can be a block copolymer wherein they are bonding in the form of a block. In addition, polycarbonate copolymers having different copolymerization proportions can be blended with each other to form a resin composition having a desired copolymerization proportion.

(iii) Intrinsic Viscosity

The above-mentioned polycarbonate resin can be molded with ease by means of known wet molding methods used for producing an electrophotographic photosensitive body such as a solution casting method, a casting method, a spray coating method, a dip coating method or the like. In order that an electrophotographic photoreceptor molded by way of a wet molding can obtain satisfactory film strength, the preferable intrinsic viscosity is 0.30-2 dl/g, and in case when film forming properties and film strength is considered to be important, the more preferable intrinsic viscosity is 0.40-1.5 dl/g.

(iv) Process for Producing Polycarbonate Resin

The polycarbonate resin to be used for the photosensitive layer of the electrophotographic photosensitive body of the resent invention can be produced by reacting raw material bisphenols which can derive the above-mentioned structural unit (1) and other structural units to be added if necessary with a carbonate-forming compound. As the method thereof, a known method used for producing polycarbonate from bisphenol A and a carbonate-forming compound such as a direct reaction process of bisphenols and phosgene (a phosgene method) and an ester exchange reaction (a transesterification method) of bisphenols with bisarylcarbonates can be employed.

Of the phosgene method and the transesterification method, the phosgene method is more preferable in view of reactivity of a bisphenol which derives the structural unit (1).

The bisphenol which derives the structural unit (1) is represented by the following structural formula (2).

[Chemical Formula 3]

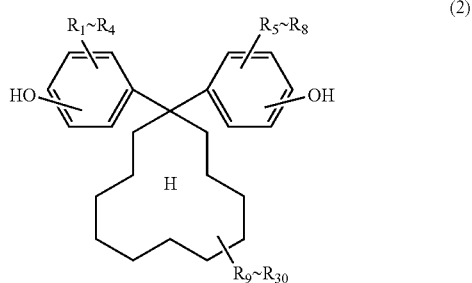

(2)

In the above formula (2), $R_1$-$R_{30}$ respectively represent a hydrogen atom or a substituent selected from the group consisting of fluorine, chlorine, bromine, iodine, an alkyl group having 1-17 carbon atoms, an aryl group having 6-12 carbon atoms, an alkoxy group having 1-5 carbon atoms, an alkenyl group having 2-12 carbon atoms and an aralkyl group having 7-17 carbon atoms, as in the case of the above-mentioned formula (1).

It is more preferable that, in the above formula (2), $R_1$-$R_4$ and $R_5$-$R_8$ respectively represent independently a hydrogen atom or a substituent selected from the group consisting of an alkyl group having 1-5 carbon atoms, an aryl group having 6-12 carbon atoms, an alkoxy group having 1-2 carbon atoms, an alkenyl group having 2-5 carbon atoms and an aralkyl group having 7-10 carbon atoms, and $R_9$-$R_{30}$ respectively represent a hydrogen atom or a substituent selected from the group consisting of an alkyl group having 1-5 carbon atoms.

In case when any one of said substituents $R_1$-$R_{30}$ has a carbon atom, the carbon atom can be bonded with a halogen such as fluorine, chlorine, bromine or iodine.

Among them, it is particularly preferable that at least one of $R_1$-$R_4$ represents a hydrogen atom, at least one of $R_5$-$R_8$ represents a hydrogen atom and at least one of $R_9$-$R_{30}$ represents a hydrogen atom.

Examples thereof include 1,1-bis(4-hydroxyphenyl)cyclododecane, 1,1-bis(4-hydroxy-3-methylphenyl)cyclododecane, 1,1-bis(4-hydroxy-3-phenylphenyl)cyclododecane, 1,1-bis(4-hydroxy-3-t-butylphenyl)cyclododecane, 1,1-bis(4-hydroxy-3-sec-butylphenyl)cyclododecane, 1,1-bis(4-hydroxy-3-allylphenyl)cyclododecane, 1,1-bis(4-hydroxy-3,5-dimethylphenyl)cyclododecane, 1,1-bis(4-hydroxy-3-fluorolphenyl)cyclododecane, 1,1-bis(4-hydroxy-3-chlorophenyl)cyclododecane, 1,1-bis(4-hydroxy-3-bromophenyl)cyclododecane, 7-ethyl-1,1-bis(4-hydroxyphenyl)cyclododecane, 5,6-dimethyl-1,1-bis(4-hydroxyphenyl)cyclododecane and 1,1-bis(2-hydroxyphenyl)cyclododecane.

Two or more of these bisphenols can be used together. Among them, 1,1-bis(4-hydroxyphenyl)cyclododecane and 1,1-bis(4-hydroxy-3-methylphenyl)cyclododecane are particularly preferable.

In case when the polycarbonate resin of the present invention is a copolymer comprising other structural units, examples of bisphenols which can derive said other structural units include a bisphenol selected from the group consisting of 1,1'-biphenyl-4,4'-diol, bis(4-hydroxyphenyl)methane, bis(4-hydroxyphenyl)ether, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl) propane (bisphenol A; BPA), 2,2-bis(4-hydroxyphenyl) butane, 2,2-bis(4-hydroxy-3-t-butylphenyl)propane, 1,1-bis(4-hydroxyphenyl)cyclopentane, 1,1-bis(4-hydroxyphenyl) cyclohexane (bisphenol Z; BPZ), 1,1-bis(4-hydroxyphenyl)-3,3,5-trimethylcyclohexane, 2,2-bis(4-hydroxy-3-allylphenyl)propane, 2,2-bis(4-hydroxyphenyl) hexafluoropropane, 1,1-bis(4-hydroxyphenyl)-1-phenylethane, bis(4-hydroxyphenyl)diphenylmethane, 9,9-bis(4-hydroxyphenyl)fluorene, 9,9-bis(4-hydroxy-3-methylphenyl)fluorene, 4,4'-[1,4-phenylene-bis(1-methylethylidene)]bisphenol, 4,4'-[1,3-phenylene-bis(1-methylethylidene)]bisphenol, 4,4'-butylidene-bis(3-methyl-6-t-butylphenol), α,ω-bis[3-(o-hydroxyphenyl)propyl] polydimethyldiphenyl random copolymerized siloxane and α,ω-bis[3-(o-hydroxyphenyl)propyl]polydimethylsiloxane.

Two or more of these bisphenols can be used in combination with each other.

Among them, in addition, it is preferable to use a bisphenol selected from the group consisting of 1,1'-biphenyl-4,4'-diol, 1,1-bis(4-hydroxyphenyl)ethane, bis(4-hydroxyphenyl) ether, 2,2-bis(4-hydroxyphenyl)propane, 2,2-bis(4-hydroxy-3-methylphenyl)propane, 1,1-bis(4-hydroxyphenyl)cyclohexane and 1,1-bis(4-hydroxyphenyl)-1-phenylethane.

Particularly, it is preferable to use a bisphenol selected from the group consisting of 2,2-bis(4-hydroxyphenyl)propane and 1,1-bis(4-hydroxyphenyl)cyclohexane.

According to the process for producing the polycarbonate resin of the present invention, the percentage of the bisphenol which derives the structural unit (1) is preferably 5 to 100% by weight, more preferably 10 to 100% by weight, further preferably 50 to 100% by weight, most preferably 70 to 100% by weight based upon the total raw material bisphenols. In case when the percentage of the bisphenol which derives the structural unit (1) is too low, it may bring about the defect such as deterioration of wear resistance.

Examples of carbonate-forming compounds include phosgenes such as phosgene or triphosgene and bisarylcarbonates such as diphenylcarbonate, di-p-tolylcarbonate, phenyl-p-tolylcarbonate, di-p-chlorophenylcarbonate, dinaphthylcarbonate or the like. Two or more of these compounds can be used in combination with each other.

According to the phosgene method, in general, the bisphenols are reacted with phosgene under the presence of an acid coupling agent and a solvent. Examples of acid coupling agents include pyridine and hydroxides of alkali metals such as sodium hydroxide, potassium hydroxide or the like. Examples of solvents include methylene chloride, chloroform and monochlorobenzene.

In addition, for the purpose of accelerating the condensation polymerization reaction, a catalyst such as a tertiary amine such as triethylamine or a quaternary ammonium salt such as benzyl triethylammonium chloride can be used. Moreover, it is preferable to add monofunctional compounds such as phenol, p-t-butylphenol, p-cumylphenol, a long-chain alkyl-substituted phenol or the like as a molecular weight adjuster. If desired, an antioxidant such as sodium sulfite or hydrosulfite and/or a branching agent such as fluoroglycin, isatin bisphenol or trisphenol ethane can be added by a small amount.

Generally, it is proper to conduct the reaction in a temperature range between 0 and 150° C., preferably between 5 and 40° C. While the reaction time may vary depending on the reaction temperature, it is normally between 0.5 minutes and 10 hours, preferably between 1 minute and 2 hours. In addition, it is desirable to keep the pH of the reaction system not below 10 during the reaction.

According to the transesterification method, the bisphenols and bisarylcarbonate are mixed and reacted with each other at high temperature under reduced pressure. The reaction is generally carried out in a temperature range between 150 and 350° C., preferably between 200 and 300° C. The ultimate pressure is preferably reduced to 1 mmHg or less to remove the phenols, which are derived from said bisarylcarbonate produced as a result of the transesterification reaction, from the reaction system by distillation.

While the reaction time varies depending on the reaction temperature and the reduced pressure level, it is generally 1 to 24 hours. The reaction is preferably carried out in an atmosphere of inert gas such as nitrogen or argon. If desired, the reaction can be carried out by adding a molecular weight adjuster, an antioxidant and/or a branching agent.

It is preferable that the polycarbonate resin synthesized by the above-mentioned reaction can be molded with ease by means of known wet molding methods used for producing an electrophotographic photosensitive body such as a solution casting method, a casting method, a spray coating method, a dip coating method or the like. In order that an electrophotographic photoreceptor molded by way of a wet molding can obtain satisfactory film strength, the preferable intrinsic viscosity is 0.3-2 dl/g, and in case when film forming properties and film strength is considered to be important, the more preferable intrinsic viscosity is 0.40-1.5 dl/g.

The polycarbonate resin of the present invention thus obtained may voluntarily be blended with other synthetic resins such as various thermoplastic resins and thermosetting resins, for example, polymethylmethacrylate, polystyrene, vinyl polymers such as polyvinyl chloride and copolymers thereof, polycarbonate, polyester, polysulfon, phenoxy resins, epoxy resins and silicone resins. Moreover, it is possible, if desired, to add various ultraviolet absorbents, antioxidants or the like.

(3) Electrophotographic Photosensitive Body

The electrophotographic photosensitive body of the present invention is produced by forming a photosensitive layer (in case of multilayer type, a charge generating layer and a charge transport layer) on a conductive support. The photosensitive layer can be formed by firstly dissolving the above-mentioned charge generating material and/or charge transport material into a suitable solvent with a binder resin (in case of multilayer type, binder resins for respective layers of the charge generating layer and the charge transport layer), then coating the solution on the conductive support by means of a method used for producing an electrophotographic photosensitive body such as a solution casting method, a casting method, a spray coating method, a dip coating method or the like, and drying the coating layer.

Examples of the solvents to be used for the wet molding include halogen type organic solvents such as dichloromethane, chloroform, monochlorobenzene, 1,1,1-trichloroethane, monochloroethane and carbon tetrachloride and non-halogen type organic solvents such as aromatic hydrocarbons such as toluene and xylene, ketones such as acetone, methylethylketone, cyclohexanone and isophoron, ethers such as tetrahydrofuran, 1,4-dioxane, ethylene glycol diethyl ether and ethylcellosolve, esters such as methyl acetate and ethyl acetate as well as dimethyl formamide, dimethyl sulfoxide and diethyl formamide. For the purpose of the present invention, any of the above-listed solvents can be used each independently, or two or more of them can be used in combination with each other.

In case when the photosensitive layer, which is a single photoconductive layer, is formed by way of a wet molding dissolving the polycarbonate resin of the present invention into the above-mentioned solvent, it is preferable to prepare and use a resin solution in the concentration range of 1 to 50% by weight. Moreover, in case when the charge transport layer is formed by way of a wet molding dissolving the polycarbonate resin of the present invention into the solvent, it is preferable to prepare and use a resin solution in the concentration range of 1 to 40% by weight, wherein the concentration means a total percentage of the resin component and the charge transport material.

In case when the electrophotographic photosensitive body of the present invention is of single-layer type, the above-mentioned polycarbonate resin is used as a binder resin for the photosensitive layer (photoconductive layer). In this case, the mixing ratio of the charge generating material and the charge transport layer with the binder resin is preferably within a range between 10:1 and 1:20. More precisely, the content of the charge generating material and the charge transport material is 16 to 84% by weight, preferably 30 to 70% by weight based upon the total amount of the charge generating material, the charge transport material and the binder resin. The suitable thickness of the photoconductive layer is 2 to 100 μm, preferably 5 to 30 μm.

In case when the above-mentioned polycarbonate resin composition is used as a binder resin for the charge transport layer of a multilayer type photosensitive layer, examples of a binder resin for the charge generating layer include a polyvinyl butyral resin, a polyvinyl formal resin, a silicone resin, a polyamide resin, a polyester resin, a polystyrene resin, a polycarbonate resin, a polyvinyl acetate resin, a polyurethane resin, a phenoxy resin, an epoxy resin and various celluloses. Preferably, a polyvinyl butyral resin is used. The mixing ratio of the charge generating material and the binder resin is preferably within a range between 10:1 and 1:20. The preferable thickness of the charge generating layer is 0.01 to 20 μm, more preferably 0.1 to 2 μm.

As the binder resin for the charge transport layer, the above-mentioned polycarbonate resin of the present invention is used. The mixing ratio of the charge transport material and the binder resin is preferably within a range between 10:1 and 1:10. More precisely, the content of the charge transport is 16 to 84% by weight, preferably 30 to 70% by weight based upon the total amount of the charge transport material and the binder resin. The preferable thickness of the charge transport layer is 2 to 100 μm, more preferably 5 to 30 μm.

(4) Image Forming Apparatus

Magnetic toner or non-magnetic toner is used for forming an image using the electrophotographic photosensitive body of the present invention.

It is possible to form an image using the electrophotographic photosensitive body of the present invention only by mounting the electrophotographic photosensitive body of the present invention in place of electrophotographic photosensitive bodies used for conventional image forming apparatuses such as a copying machine and a laser beam printer. As said image forming apparatus, an apparatus having an electrifying, exposing, developing, transferring fixing and cleaning mechanism is used.

Examples of an electrifying mechanism for electrifying positively or negatively include corona discharge, a charging brush and a charging roller.

It is preferable to charge negatively for a multilayer type electrophotographic photosensitive body, and it is further preferable to employ a charging brush or a charging roller which is a contact electrifying system with reduced ozone generation.

For an exposing mechanism, a mechanism forming an electrostatic image on the photosensitive body by monochromatic light such as a white light, laser and LED can be employed. Since a digital device is a mainstream currently, it is preferable to use semiconductor laser in 780 nm or 650 nm.

The developing mechanism is a mechanism carrying toners to an electrified and exposed electrophotographic photosensitive body to visualize and a mechanism wherein toners are carried to a photosensitive body by an electrifying roller or the like is used. As toners, a two-component toner, a magnetic one-component toner or a non-magnetic one-component toner can be used, which are classified to a pulverized toner, a polymerized toner and the like depending on the producing process.

The transferring mechanism is a mechanism transferring toner onto a sheet of paper directly or after once transferred to a transfer belt or a transfer roller. As the transferring mechanism, an electrostatic transfer system impressing a high bias voltage is commonly used.

As the fixing mechanism, it is common to employ a mechanism wherein the toner is fixed on a sheet of paper at the same time that the toner transferred to the sheet is transported by a heating roller and a pressure roller.

The cleaning mechanism is a mechanism removing residual toner left after transfer on the electrophotographic photosensitive body by scratching mechanically and a method of using a fur brush or a cleaning blade can be exemplified, among which a method of using a cleaning blade is commonly used currently.

EXAMPLES

The present invention will be described in more detail below referring to Examples. Note that the scope of the present invention is not limited by the following examples.

Example 1

140.8 g (0.4 mol) of 1,1-bis(4-hydroxyphenyl)cyclododecane, manufactured by Taoka Chemical Co., Ltd. in Japan (hereinafter, "BPCD"), and 0.1 g of hydrosulfite were dissolved into 1100 ml of 5 w/w % aqueous solution of sodium hydroxide.

Then, 500 ml of methylene chloride was added to the aqueous solution and 60 g of phosgene was blown into the solution over a period of 60 minutes, while stirring the solution and keeping the temperature of the solution to 15° C.

After the completion of blowing phosgene in, 1.67 g of p-t-butylphenol, manufactured by Dainippon Ink And Chemicals, Inc. (hereinafter, "PTBP"), was added as a molecular weight adjuster and the solution was stirred intensely to emulsify the reaction solution. After emulsification, 0.4 ml of triethylamine was added and the emulsion was stirred at 20 to 25° C. for about an hour for polymerization.

After the completion of the polymerization, the reaction solution was separated into an aqueous phase and an organic phase. The organic phase was neutralized by phosphoric acid and was washed repeatedly with water until the electric conductivity of the upper solution (aqueous phase) falls not higher than 10 μS/cm. The polymer solution thus obtained was dropped into warm water held to 45° C. and the solvent was removed by evaporation to obtain a white powdery precipitate. The precipitate thus obtained was filtered and dried at 105° C. for 24 hours to obtain powder of the polymer.

The intrinsic viscosity of the solution of the polymer in the solvent of methylene chloride with a concentration of 0.5 g/dl at 20° C. was 0.48 dl/g. The polymer thus obtained was analyzed by means of infrared absorption spectrometry. As a result, the absorption due to a carbonyl group was observed at a position near 1,770 $cm^{-1}$ and the absorption due to an ether bond was observed at a position near 1,240 $cm^{-1}$, whereby it was confirmed that the polymer was a polycarbonate resin having a carbonate bond.

Thereafter, a coating solution was prepared by using 50 parts by weight of N,N'-bis(3-methylphenyl)-N,N'-bis(phenyl)benzidine manufactured by SYNTEC, tradename "ST16/1.2", 50 parts by weight of the polycarbonate resin obtained as a result of the above described synthetic polymerization, 50 parts by weight of tetrahydrofuran and 300 parts by weight of toluene. The coating solution thus obtained was coated onto a commercially available LBP photosensitive body, manufactured by Seiko Epson Corp., tradename "LPA3ETC4", from which the charge transport layer had been removed in advance by tetrahydrofuran. Then, the coated solution was dried in flowing air and then left for drying at 100° C. for 8 hours to form an about 20 μm-thick charge transport layer to produce a multilayer type electrophotographic photosensitive body (hereinafter, "OPC").

An HB pencil hardness test was carried out based upon JIS-5600 at 10 positions in the direction of 90° to the rotational direction on the surface of the above-produced OPC, and then the surface appearance was observed. Afterwards, said OPC was mounted in a commercially available LBP (LBP-8400: tradename, manufactured by Seiko Epson Corp.) and the LBP was driven continuously to print an entirely black solid image on 5,000 sheets of recycled OA paper (LBP-190R-A4B, manufactured by Tochiman Co., Ltd.), a wear amount of OPC after printing was measured. The results were shown in Table 1.

Example 2

Synthesis was carried out in the same manner as Example 1 except that 152 g of 1,1-bis(4-hydroxy-3-methylphenyl)cyclododecane, manufactured by Taoka Chemical Co., Ltd. in Japan (hereinafter, "DMBPCD"), was used in place of BPCD and the amount of PTBP was changed to 0.82 g.

The intrinsic viscosity of the polycarbonate resin thus obtained was 0.76 dl/g. OPC was molded and performances thereof were evaluated in the same manner as Example 1 using the polycarbonate resin thus synthesized. The results were shown in Table 1.

Example 3

Synthesis was carried out in the same manner as Example 1 except that the amount of BPCD was changed to 98.56 and 42.24 g of 1,1-bis(4-hydroxyphenyl)cyclohexane, manufactured by Taoka Chemical Co., Ltd. in Japan (hereinafter, "BPZ"), was used in combination with BPCD.

The intrinsic viscosity of the polycarbonate resin thus obtained was 0.52 dl/g. OPC was molded and performances thereof were evaluated in the same manner as Example 1 using the polycarbonate resin thus synthesized. The results were shown in Table 1.

Example 4

Synthesis was carried out in the same manner as Example 1 except that the amount of BPCD was changed to 112.64 and 14.08 g of 2,2-bis(4-hydroxyphenyl)propane, manufactured by Mitsui Chemicals, Inc. in Japan (hereinafter, "BPA"), and 14.08 g of 1,1'-biphenyl-4,4'-diol, manufactured by Honshu Chemical Industry Co., Ltd. in Japan (hereinafter, "BP"), were used in combination with BPCD.

The intrinsic viscosity of the polycarbonate resin thus obtained was 0.54 dl/g. OPC was molded and performances thereof were evaluated in the same manner as Example 1 using the polycarbonate resin thus synthesized. The results were shown in Table 1.

Example 5

Synthesis was carried out in the same manner as Example 1 except that the amount of BPCD was changed to 112.64 and 14.08 g of 2,2-bis(4-hydroxy-3-methylphenyl)propane, manufactured by Honshu Chemical Industry Co., Ltd. in Japan (hereinafter, "BPC"), and 14.08 g of 1,1-bis(4-hydroxyphenyl)-1-phenylethane, manufactured by Honshu Chemical Industry Co., Ltd. in Japan (hereinafter, "BPAP"), were used in combination with BPCD.

The intrinsic viscosity of the polycarbonate resin thus obtained was 0.51 dl/g. OPC was molded and performances thereof were evaluated in the same manner as Example 1 using the polycarbonate resin thus synthesized. The results were shown in Table 1.

Example 6

Synthesis was carried out in the same manner as Example 1 except that the amount of BPCD was changed to 112.64 and 28.16 g of 1,1-bis(4-hydroxyphenyl)ethane, manufactured by Honshu Chemical Industry Co., Ltd. in Japan (hereinafter, "BPE"), was used in combination with BPCD.

The intrinsic viscosity of the polycarbonate resin thus obtained was 0.51 dl/g. OPC was molded and performances thereof were evaluated in the same manner as Example 1 using the polycarbonate resin thus synthesized. The results were shown in Table 1.

Example 7

Synthesis was carried out in the same manner as Example 1 except that the amount of BPCD was changed to 112.64 and 28.16 g of bis(4-hydroxyphenyl)ether, manufactured by Dainippon Ink And Chemicals, Inc. in Japan (hereinafter, "DHPE"), was used in combination with BPCD.

The intrinsic viscosity of the polycarbonate resin thus obtained was 0.54 dl/g. OPC was molded and performances thereof were evaluated in the same manner as Example 1 using the polycarbonate resin thus synthesized. The results were shown in Table 1.

Comparative Example 1

OPC was molded and performances thereof were evaluated in the same manner as Example 1 except that a coating solution was prepared using a commercially available BPA type homopolycarbonate resin (manufactured by Mitsubishi Gas Chemical Co., Inc., tradename "Iupilon S-2000", intrinsic viscosity; 0.51 dl/g) in place of the polycarbonate resin of Example 1 and 530 parts by weight of methylenechloride in place of tetrahydrofuran and toluene. The results were shown in Table 1.

Comparative Example 2

OPC was molded and performances thereof were evaluated in the same manner as Example 1 except that a coating solution was prepared using a BPZ type homopolycarbonate resin (manufactured by Mitsubishi Gas Chemical Co., Inc., tradename "PCZ-400", intrinsic viscosity; 0.76 dl/g), which is a commercially available binder resin for an electrophotographic photosensitive body, in place of the polycarbonate resin of Example 1. The results were shown in Table 1.

TABLE 1

| Raw Material Bisphenol (% by weight) | Intrinsic Viscosity (dl/g) | HB Pencil Hardness Test | Wear Resistance of Photosensitive Body Wear Amount (mg) |
|---|---|---|---|
| Example 1 BPCD: 100% | 0.48 | ○ | 53 |
| Example 2 DMBPCD: 100% | 0.76 | ○ | 45 |
| Example 3 BPCD: 70% BPZ: 30% | 0.52 | ○ | 55 |
| Example 4 BPCD: 80% BPA: 10% BP: 10% | 0.54 | ○ | 54 |
| Example 5 BPCD: 80% BPC: 10% BPAP: 10% | 0.51 | ○ | 53 |
| Example 6 BPCD: 80% BPE: 20% | 0.51 | ○ | 52 |
| Example 7 BPCD: 80% DHPE: 20% | 0.54 | ○ | 48 |
| Comp. Example 1 BPA: 100% | 0.51 | X | 81 |
| Comp. Example 2 BPZ: 100% | 0.76 | Δ | 70 |

<Test Procedure>
(1) HB Pencil Hardness Test:

A commercially available HB pencil, manufactured by Mitsubishi Pencil Co., Ltd., tradename "UNI", is settled in a pencil scratch testing machine for a coating film, manufactured by Imoto Machinery Co., Ltd., and a pencil hardness test based on JIS-5600 was carried out at 10 positions in the direction of 90° to the rotational direction on the surface of the above-prepared OPC, and the appearance was observed under a fluorescent lamp. The case wherein scratch was observed in all 10 positions is indicated "x", the case wherein scratch was observed in 1 to 5 positions is indicated "Δ" and the case wherein scratch was not observed at all is indicated "○".

(2) Wear Amount of the Photosensitive Body:

After HB Pencil Hardness Test, the OPC was mounted in a commercially available LBP (LBP-8400: tradename, manufactured by Seiko Epson Corp.) and the LBP was driven continuously to print an entirely black solid image on 5,000 sheets of recycled OA paper (LBP-190R-A4B, manufactured by Tochiman Co., Ltd.), a wear amount of OPC after printing was measured.

INDUSTRIAL APPLICABILITY

The present invention can be applied to an electrophotographic photosensitive body excellent in pencil scratch resistance and wear resistance.

What is claimed is:

1. An electrophotographic photosensitive body having a conductive support and a photosensitive layer formed on said conductive support, wherein a polycarbonate resin comprising a structural unit (1) represented by the following formula:

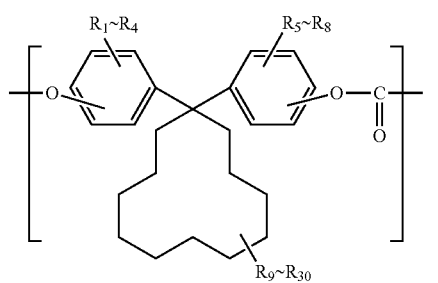

(1)

wherein $R_1$-$R_{30}$ respectively represent a hydrogen atom or a substituent selected from the group consisting of fluorine, chlorine, bromine, iodine, an alkyl group having 1-17 carbon atoms, an aryl group having 6-12 carbon atoms, an alkoxy group having 1-5 carbon atoms, an alkenyl group having 2-12 carbon atoms and an aralkyl group having 7-17 carbon atoms, and at least one structural unit derived from a bisphenol selected from the group consisting of 1,1'-biphenyl-4,4'-diol, 1,1-bis(4-hydroxyphenyl)ethane, 2,2-bis(4-hydroxyphenyl)propane, 2,2-bis(4-hydroxy-3-methylphenyl)propane, 1,1-bis(4-hydroxyphenyl)cyclohexane and 1,1-bis(4-hydroxyphenyl)-1-phenylethane, and having an intrinsic viscosity of 0.3 to 2 dl/g is used as a binder resin for the photosensitive layer.

2. The electrophotographic photosensitive body according to claim 1, wherein said structural unit (1) is derived from 1,1-bis(4-hydroxyphenyl)cyclododecane or 1,1-bis(4-hydroxy-3-methylphenyl)cyclododecane.

3. The electrophotographic photosensitive body according to claim 2, wherein a content of said structural unit (1) is 70 to 80% by weight based upon the total units constituting the polycarbonate resin.

4. The electrophotographic photosensitive body according to claim 2, wherein said photosensitive layer is of multilayer type consisting of a charge generating layer and a charge transport layer.

5. An image forming apparatus, wherein the electrophotographic photosensitive body according to claim 2 is mounted therein.

6. The electrophotographic photosensitive body according to claim 1, wherein a content of said structural unit (1) is 70 to 80% by weight based upon the total units constituting the polycarbonate resin.

7. The electrophotographic photosensitive body according to claim 6, wherein said photosensitive layer is of multilayer type consisting of a charge generating layer and a charge transport layer.

8. An image forming apparatus, wherein the electrophotographic photosensitive body according to claim 6 is mounted therein.

9. The electrophotographic photosensitive body according to claim 1, wherein said photosensitive layer is of multilayer type consisting of a charge generating layer and a charge transport layer.

10. The electrophotographic photosensitive body according to claim 9, wherein said polycarbonate resin is used as a binder resin for said charge transport layer.

11. An image forming apparatus, wherein the electrophotographic photosensitive body according to claim 10 is mounted therein.

12. An image forming apparatus, wherein the electrophotographic photosensitive body according to claim 9 is mounted therein.

13. An image forming apparatus, wherein the electrophotographic photosensitive body according to claim 1 is mounted therein.

* * * * *